United States Patent
Tiittanen et al.

(10) Patent No.: US 7,307,957 B2
(45) Date of Patent: Dec. 11, 2007

(54) AUTOCONFIGURATION OF CONTROL CONNECTIONS IN AN EXCHANGE

(75) Inventors: Tero Tiittanen, Espoo (FI); Reijo Koivula, Espoo (FI)

(73) Assignee: Nokia Corporation, Espoo (FI)

( * ) Notice: Subject to any disclaimer, the term of this patent is extended or adjusted under 35 U.S.C. 154(b) by 958 days.

(21) Appl. No.: 10/182,546

(22) PCT Filed: Jan. 9, 2001

(86) PCT No.: PCT/FI01/00017

§ 371 (c)(1),
(2), (4) Date: Oct. 28, 2002

(87) PCT Pub. No.: WO01/58093

PCT Pub. Date: Aug. 9, 2001

(65) Prior Publication Data

US 2003/0103511 A1    Jun. 5, 2003

(30) Foreign Application Priority Data

Feb. 1, 2000    (FI) .................................. 20000205

(51) Int. Cl.
*H04L 12/26* (2006.01)
(52) U.S. Cl. .................... 370/250; 370/252; 370/241.1
(58) Field of Classification Search ............. 370/236.2, 370/241, 241.1, 242, 244, 246, 247, 248, 370/249, 250, 251, 252
See application file for complete search history.

(56) References Cited

U.S. PATENT DOCUMENTS

| | | | |
|---|---|---|---|
| 5,233,607 A | 8/1993 | Barwig et al. ............. 370/94.1 |
| 5,313,453 A | 5/1994 | Uchida et al. ................ 370/13 |
| 5,781,546 A | 7/1998 | Sethu ........................ 370/389 |
| 5,802,052 A | 9/1998 | Venkataraman ............. 370/395 |
| 5,838,989 A | 11/1998 | Hutchison et al. .......... 395/831 |
| 5,859,846 A | 1/1999 | Kim et al. .................. 370/389 |

(Continued)

FOREIGN PATENT DOCUMENTS

EP    0446492 A1    9/1991

(Continued)

*Primary Examiner*—Wing Chan
*Assistant Examiner*—Mark A. Mais
(74) *Attorney, Agent, or Firm*—Squire, Sanders & Dempsey L.L.P.

(57) ABSTRACT

The invention concerns autoconfiguration of control connections in a telecommunication switch. Multiplexers (31, 32, 33) themselves and without external control information find out which ports of the switching fabric (34) they are in connection with. After finding out the ports, logical connections are established. Each multiplexer forms probe cells addressed to each of the ports (0, 1, 2). Each probe cell includes one port index, preferably in the header. The switching fabric (34) switches the probe cell to that output port which has been indicated in the header of the probe cell. Thus, those probe cells fed from a port into the switching fabric are returned to the same port if the target in the header is the same as the port number. In consequence of this, the multiplexer receives only the same kind of probe cells. After the connection ports have been determined, a logical connection between each of the multiplexers (31, 32, 33) and the operation and maintenance unit (35) is established. The processor units connected to the multiplexers can now receive configuration information and instructions from the operation and maintenance unit (35).

16 Claims, 6 Drawing Sheets

U.S. PATENT DOCUMENTS

| | | | |
|---|---|---|---|
| 6,240,090 B1 * | 5/2001 | Enhager | 370/241.1 |
| 6,501,757 B1 * | 12/2002 | Kamaraj et al. | 370/395.41 |
| 6,700,809 B1 * | 3/2004 | Ng et al. | 365/49 |
| 6,876,559 B1 * | 4/2005 | Rathnavelu et al. | 365/49 |

FOREIGN PATENT DOCUMENTS

| | | |
|---|---|---|
| WO | WO 99/33320 | 7/1999 |

\* cited by examiner

*PRIOR ART*

FIG. 3

*PRIOR ART*

AUTOCONFIGURATION OF CONTROL CONNECTIONS IN AN EXCHANGE

FIELD OF THE INVENTION

The present invention relates to establishing virtual connections between a plurality of telecommunication equipment. In particular, the invention relates to internal traffic in a node of a broadband telecommunication network, such as an ATM node.

BACKGROUND OF THE INVENTION

The basic function of a modern digital exchange is to connect the exchange input port to the correct output port, in other words, to connect an incoming call on a specific incoming circuit to an outgoing call on a specific outgoing circuit. The core of the system is the exchange control, whose functions have been distributed over a plurality of units, each carrying out its own task. As examples of such units are a unit controlling the switching matrix, signaling units carrying out different types of signaling and supervision at the input and output sides, a unit collecting call-specific charging data, a unit gathering statistics, etc. Each unit comprises at least one central processing unit CPU, a bus, and memory. Thus, each unit actually constitutes a computer.

In addition, the exchange comprises an Operation and Maintenance Unit (O&M), which takes care of the maintenance of the system.

Apart from the type described above, the telecommunication network nodes may also be ATM nodes (Asynchronous Transfer Mode). ATM is a connection-oriented, packet switched, general purpose, and scalable data transmission method in which information is sent in fixed-length cells. The cell consists of a five-byte-long header and a 48-byte-long information section. The header fields include a Virtual Path Indicator (VPI) and a Virtual Channel Indicator (VCI). At the ATM switch, the cells are transferred from a logical input channel to one or more logical output channels. The logical channel consists of the number of the physical link (e.g. optical cable) and the channel identifier on this link, in other words the VPI/VCI information. One physical transfer medium, such as an optical cable, may comprise a plurality of virtual paths VP, and each virtual path comprises a plurality of virtual channels VC.

Because the cells are of a fixed length, the connections at ATM switches can be performed at hardware level on the basis of the cell header, and therefore at very high speed. Cells belonging to different connections are distinguished from one another on the basis of the virtual path (VPI) and the virtual channel (VCI) identifier. As the connection is set up, a fixed route is determined through the network, i.e. a virtual link along which the cells of the connection are routed. Based on the VPI/VCI values, the cells are switched at the network nodes. The VPI/VCI values are transmission link specific and consequently usually change in connection with switching at the VP or VC level. At the end of the data transfer, the connection is released.

Figure 1:
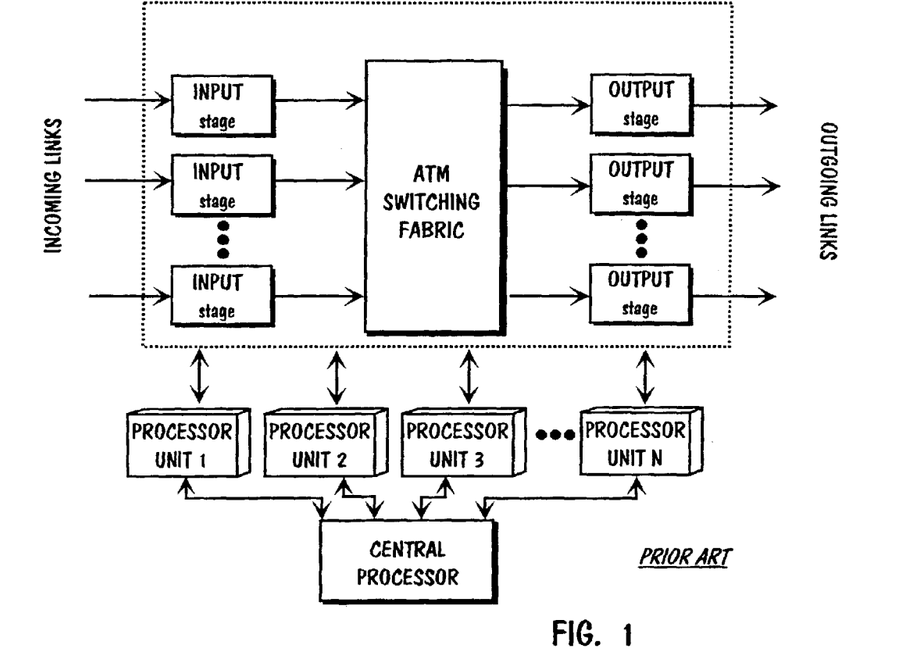
FIG. 1 illustrates an ATM switch.

FIG. 1 illustrates a simplified ATM switch. It consists of input stages and output stages, into which the physical input and output lines are connected, and of a switching fabric. The physical line can consist of any suitable medium, of an optical fiber as shown in the figure, of a twisted pair, of a coaxial cable, for example. As an example the medium herein is the optical fiber. The input and output stages constitute the external network interfaces. The interface type may be either UNI (User Network Interface) or NNI (Network Node Interface). The input stage reads the address information, i.e. the VPI and VCI identifiers, of the cell received from the input link and converts them into new VPI/VCI values which the output stage inserts into the header of the cell sent to the output link.

The software of the switch is distributed over functional blocks, processor units 1, . . . N., handled by computers. The computers are nearly always of the embedded type, meaning that display units and other peripheral devices are not required.

Figure 2:
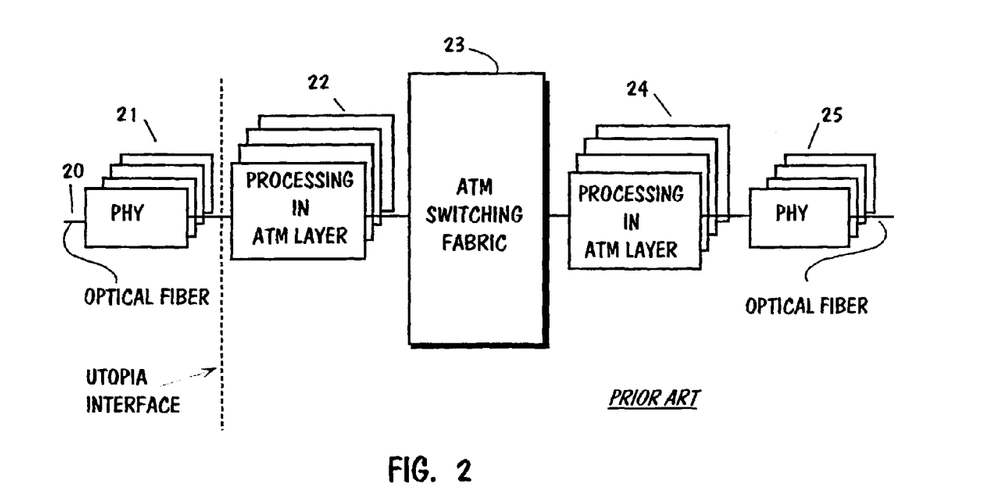
FIG. 2 illustrates network connections of the ATM switch.

FIG. 2 is a more detailed illustration of an ATM switch. A cell, either of the UNI or NNI type, from optical fibre 20 is received at circuit 21 of the PHY layer (Physical Layer) that terminates the line. The PHY carries out transmission system specific tasks at the bit level and is responsible for cell adaptation to each of the transmission systems, as well as for cell masking, cell header error checks, and cell rate justification.

From circuit 21 of the PHY layer, the cell passes to circuit 22 of the ATM layer. The ATM layer only deals with the cell header, its tasks being cell switching, multiplexing and demultiplexing, and cell header generation and removal. Above the ATM layer, the AAL (ATM Adaptation Layer) fragments the higher layer frames and reassembles them at the other end, in other words, carries out the SAR (Segmentation and Re-assembly) function.

Circuit 22 of the ATM layer sends the cell to the input buffer of ATM switching fabric 23. From there, the fabric connects it to the other side of the fabric, to output port 25. At the output port, the VPI/VCI value in the cell address field is examined, and the cell is transmitted to the correct virtual channel.

The processor units in FIG. 1 must be able to negotiate with each other. The most common way is to set up a dedicated common message bus, into which the units are connected via a bus adapter.

Figure 3:
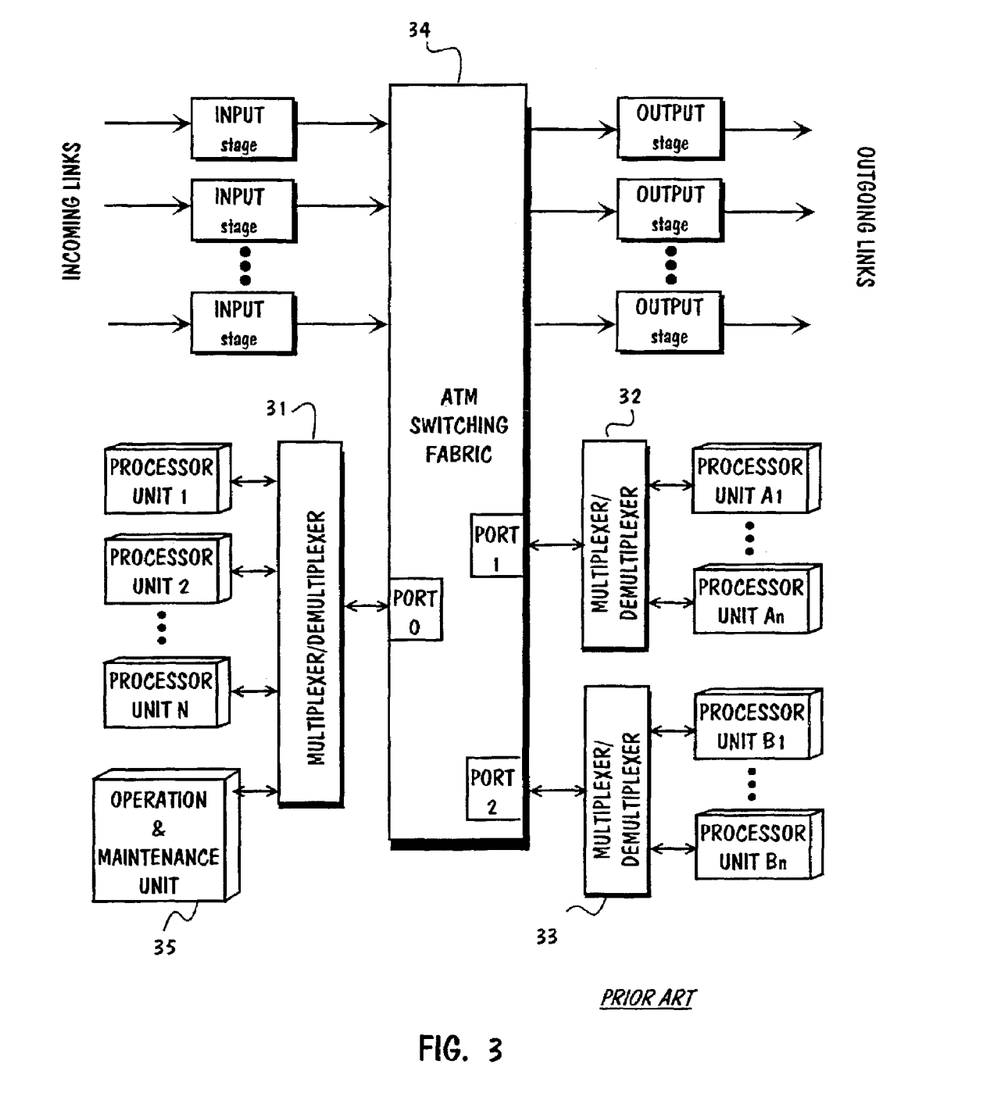
FIG. 3 depicts the connection of processor units in a switch.

FIG. 3 depicts another of arranging the routing of the internal-traffic of cells through the ATM switching fabric. A group of processor units, here Processor Unit 1, . . . , Processor Unit N, are connected to multiplexer 31, whereas a second group of units, Processor Unit A1, . . . , Processor Unit An, are connected to multiplexer 32. A third group of units, Processor Unit B1, . . . , Processor Unit Bn, are connected to multiplexer 33. A multiplexer multiplexes ATM cells received from an attached group of units to an input port of ATM switching fabric 34, which routes the cells through the fabric to destination output ports.

For example, let us consider a case when processor unit 1 is sending cells to processor unit B1 and processor unit N is sending cells to processor unit 2. Multiplexer 31 provides the cells with the proper VPI/VCI addresses and multiplexes the cells to input port 0 of the switching fabric. The switching fabric returns the cells addressed to processor unit N to output port 0. Demultiplexer 31 routes the cells further to processor unit N.

Switching matrix 34 routes the cells addressed to processor unit B1 to output port 1, whereupon multiplexer 33, which is connected to that port, routes the cells to target processor unit B1.

Still referring to FIG. 3, it is advantageous to form a group of processor units from the units having similar processor types. Hence, processors of units from 1 to N could be general purpose microprocessors, whereas processors of units from B1 to Bn could be signal processors.

Operation and maintenance unit 35 is also connected through multiplexer 31 to port 0 of ATM switching fabric 34.

The task of the operation and maintenance unit is to ensure that the functional units of the exchange are operating properly. In addition, the unit acts as an input and output device through which the operator can update software and input instructions to the software. For those purposes there are bi-directional control connections between the operation and maintenance unit 35 and the processor units.

The operation and maintenance unit plays an especially important role when commissioning the exchange. After the power to various units of the exchange has been switched on, the operation and maintenance unit ensures that the exchange starts to operate properly.

A problem in the prior art exchanges switching packets of a fixed length is how to form control connections between the operation and maintenance unit and the processor units from the time the power is switched on. These connections are needed for downloading the program code from the operation and maintenance unit to the processor units.

Figure 4:
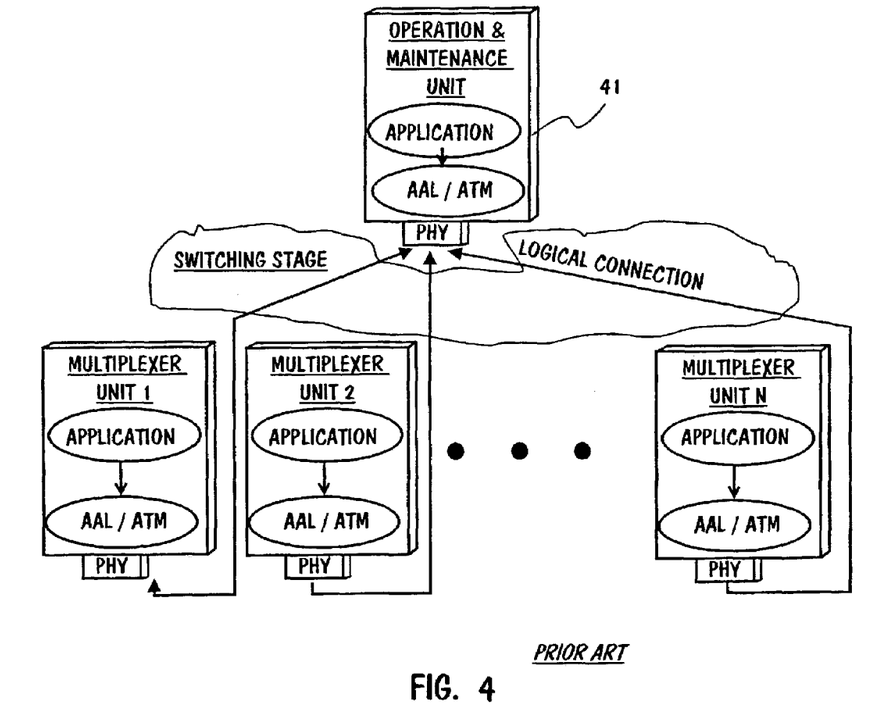
FIG. 4 shows the connection between an operation and maintenance unit and multiplexers, FIG. 5 show an index table in a multiplexer.

FIG. 4 illustrates this problem. In reality, the problem is reduced to that of how to establish a connection between each of the multiplexers and the operation and maintenance unit. A software application runs in each of the multplexor units 1-N of the exchange. Accordingly, a plurality of software applications runs in operation and maintenance unit 41. In order for the operation and maintenance unit to be able to control the setting-up of the processor units, a logical channel for communication through the switching fabric is needed between operation and maintenance unit 41 and each of the multiplexers. After the logical channels have been created, the applications in processor units (see FIG. 3) can communicate with the applications in the operation and maintenance unit for further configuration instructions during the setting-up process. The applications running in the processor units are directly connected to the operation and maintenance unit via the AAL/ATM and PHY layers.

Unfortunately, the multiplexer units can not begin creating logical channels because they do not know to which port of the switching fabric they are physically connected. Due to the lack of logical channels, processor units can not receive a program code from the operation and maintenance unit.

A prior art solution for the problem is that after switching the power on, the operator enters information about the connection port manually into each of the multiplexer units. In addition, software programs including configuration information are loaded manually into the memories of the processor units. Alternatively, all the program code which is necessary for powering up the processor units may be stored in the flash memory of the unit. However, this solution is not acceptable because upgrading a program code is difficult. Hence, only a minimum amount of the program code is stored in the flash memory, the rest of the code is retrieved from the operation and maintenance unit.

A drawback of the known method is that entering information about connection ports manually to several multiplexer units and loading the program code into the units are a time consuming and error-prone operation.

SUMMARY OF THE INVENTION

The objective of the present invention is to devise a method which makes possible autoconfiguration of control connections, i.e. multiplexers themselves and without external control information determine to which ports of the switching fabric they are connected. After the ports are known, logical connections are established.

According to the invention, each multiplexer forms special cells which are hereafter called probe cells. A port number is included in that part of the cell which tells the target of the probe cell. A predetermined termination point index in the multiplexer is also included to the probe cell. Hence, the number of different probe cells is the number of the ports of the switching fabric.

The invention is based on the fact that the switching fabric switches the probe cell to that output port the port number of which has been indicated in the probe cell. Thus, the probe cells fed from a certain port into the switching fabric are returned to that certain port if the port number included in the probe cell is the same as the number of that certain port. In consequence of this, the multiplexer receives only the same kind of probe cells and, moreover, the payload of the received cells tells the multiplexer to which port of the switching fabric the multiplexer has been connected. Each probe cell received from the switching fabric includes the same termination point index. Based on that index the multiplexer routes the received probe cells to the same place, preferably to the processor.

Other cells are routed to the ports the port numbers of which are included to the probe cells. As a result, a multiplexer receives from the switching fabric not only probe cells which it has itself sent to the switching fabric but also cells which have been sent to the switching fabric by other multiplexers connected to other ports. However, all the received cells are addressed to the same port, which corroborates that the multiplexer has been connected to the port indicated in the received cells.

After the connection ports have been determined, a logical connection between each of the multiplexers and the operation and maintenance unit is established. The processor units connected to the multiplexers can now receive configuration information and instructions from the operation and maintenance unit.

BRIEF DESCRIPTION OF THE DRAWINGS

The invention is described in closer detail with reference to the attached schematic drawings, in which.

DETAILED DESCRIPTION OF THE INVENTION

The invention will now be described in greater detail. It is known to those skilled in the art that a multiplexer includes a plurality of indexed termination points.

Figure 5:
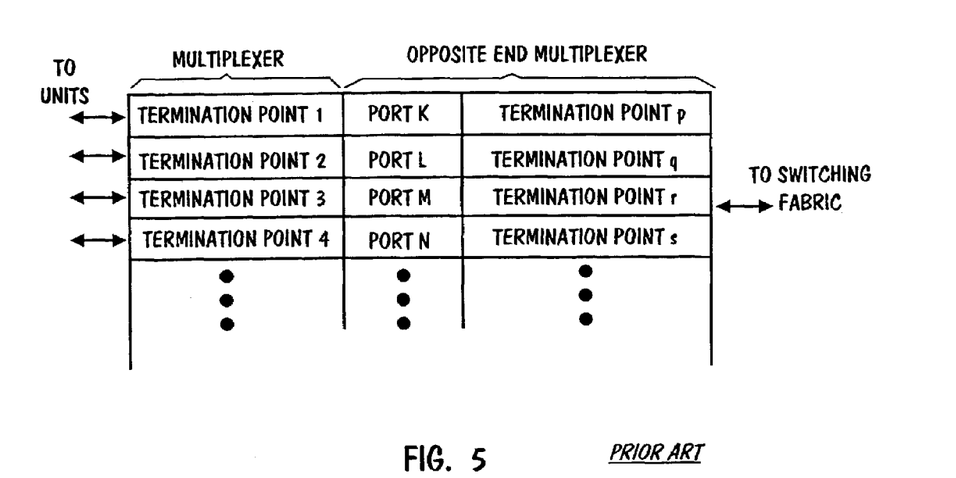

FIG. 5 depicts the general concept of the termination points. A termination point connects a virtual channel from the side of the switching fabric to a channel between the multiplexer and a processor unit. One can imagine that a processor unit connected to termination point 1 will send information to a multiplexer connected to port K of the switching fabric and further to the processor unit, which is connected to termination point p in the multiplexer at the opposite end. That's why the information about the multiplexer at the opposite end, i.e. port index K and termination point p, is linked to termination point 1. In this manner the first row of the table is created. Further rows can be created accordingly. In this manner each processor unit can send information to any of the other processor units via a virtual channel which is determined by the port and the termination point of the multiplexer at the opposite end. It is worth noting that if a processor unit communicates with another processor unit connected to the same multiplexer, packets travel to the switching fabric, which returns them to the proper termination point.

Figure 6:
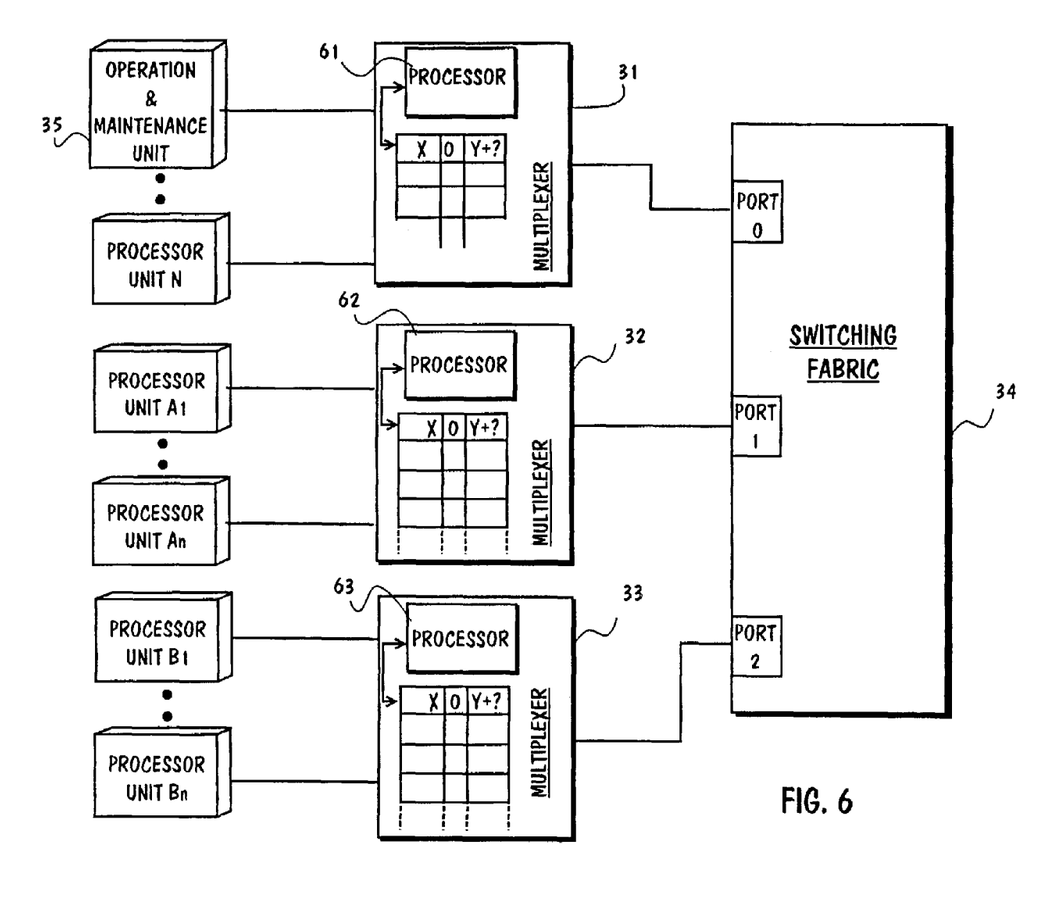
FIG. 6 depicts the starting point of the invention.

FIG. 6 is basically the same as FIG. 3 except that the afore-described termination point tables are included in multiplexers 31, 32, and 33. A prerequisite for the invention is that the port of the switching fabric is known to which the operation and maintenance unit is connected via the multiplexer. In FIG. 6 that port is denoted with numeral 0. Hence, the system knows that operation and maintenance unit 35 is always connected to port 0. Further, internal processor 61 of multiplexer 31 is connected to the predetermined termination point X.

The internal processors of multiplexers 32 and 33 are also connected to termination point X of said multiplexers. The first row of indexes in the tables of the multiplexers can now be formed from termination point X, from index 0 and from index Y+?. Index 0 refers to port 0 at the opposite end of a logical channel, i.e. to multiplexer 31, and y+? refers to termination point Y+? in this multiplexer.

The reason for indexing termination points by Y+? is that the question mark will be replaced with an actual port number after it has been determined. More rows, i.e. more termination points, can then be activated easily as will be explained later.

Figure 7:
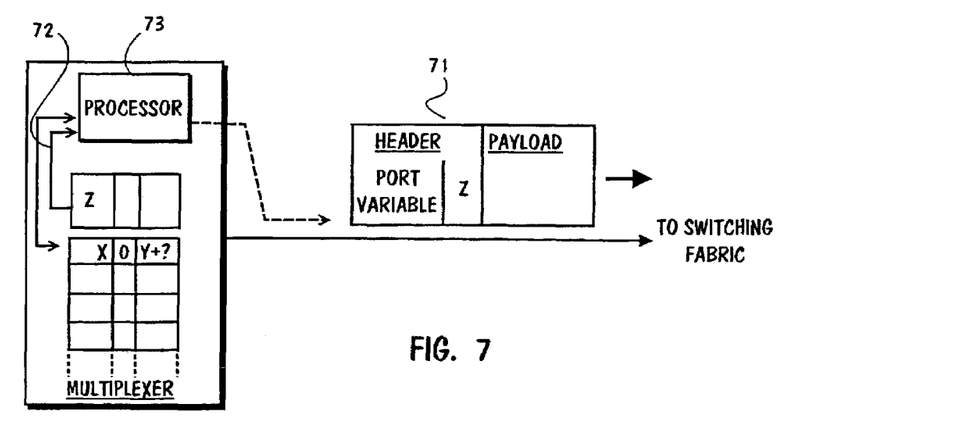
FIG. 7 illustrates the forming of a probe cell.

In order to find out the port to which a multiplexer is connected, the multiplexer adds an extra row to the table. This is illustrated in FIG. 7. The row includes only one index Z, i.e. the termination point index Z. This row is connected with line 72 to the processor 73 which indicates that the cells arriving from the switching fabric and addressed to the termination point Z, are transferred directly to the processor. This function will be explained in more detail below.

Based on the index in row 1, processor 73 of the multiplexer forms probe packet or probe cell 71. The probe cell contains the index value of a port variable and the index Z. The index Z refers to the target termination point of the multiplexer. Preferably the index value and the index Z are attached to the header of the cell type used in the system as shown in the figure. The port variable can have any of the port index values of the switching fabric. Hence, the number of different probe packets is the same as the number of ports in the switching fabric. If the number of ports is three, the multiplexer sends a burst of three different types of probe cells to the switching fabric.

Figure 8:
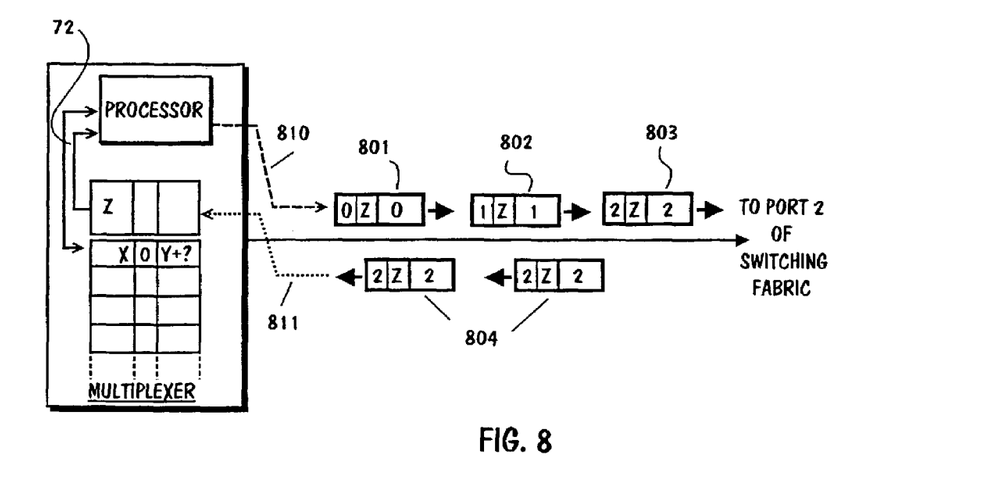
FIG. 8 illustrates a response to the sending of the probe cells.

FIG. 8 depicts the transmission of the probe cells. Note, that the probe cells are transmitted directly without terminating to any termination point. This is depicted with dotted line 810. It is still assumed that the exemplary switching fabric has three ports as shown in FIG. 6. Further, the multiplexer considered is multiplexer 33. Multiplexer 33 sends three types of probe cells. The target port of the first type 801 is port 0 and the target termination point is Z. The payload can be empty but some information can also be inserted into it, the target port number for example. The target port of the second type 802 is port 2 and the target termination point is Z Accordingly, the target port of the third type 803 is port 2 and the target termination point is Z.

Aternatively, it is possible that the processor sends the probe cells in a conventional ATM-channel which are terminated in the ATM layer. In that case the probe cells are formed so that the header includes the target termination point Z and a port variable which can have any one of the port indexes whereas the payload contains the target port number.

The switching fabric receives a burst of the above-mentioned probe cells and routes them to the destination ports indicated in the headers of the probe cells. As a result, the first types of the probe cells are routed to port 0, the second type of the probe cells are routed to port 1, and the third type 803 of the probe cells are routed to port 2. So, multiplexer 33 receives from the switching fabric the same probe cells 803 which the multiplexer transmitted to the switching fabric. In the multiplexer the received cells are terminated to that termination point which is indicated in the received cells. Hence, the cells are terminated to the termination Z from which the cells are further transferred to the processor 63. This is depicted with line 811 in the figure. Multiplexer 33, or in this example the processor, uncovers from the received probe cells information and finds out that the port variables in the cells are the same, namely port index 2. Now the multiplexer is able to determine that it has been connected to port 2 of the switching fabric.

In addition, the multiplexer also receives those probe cells, denoted with reference numeral 804, which have the destination port index 2 in the header but which were transmitted by the other multiplexers. Uncovering the contents of those probe cells also results in port index 2. Hence, that result further confirms that the multiplexer has been connected to port 2.

In the above-described manner each of multiplexers finds out the port to which the multiplexer is connected.

There may also be one or more multiplexers which are not connected to the switching fabric but which are standing by. Those multiplexers also send probe cells into the switching fabric, but due to lack of connections, they never receive any return cells. Consequently, the multiplexer makes a decision that it is in reserve. Not until the system has given the multiplexer an activation order, will the multiplexer start to determine the connection port in the manner described above.

Figure 9:
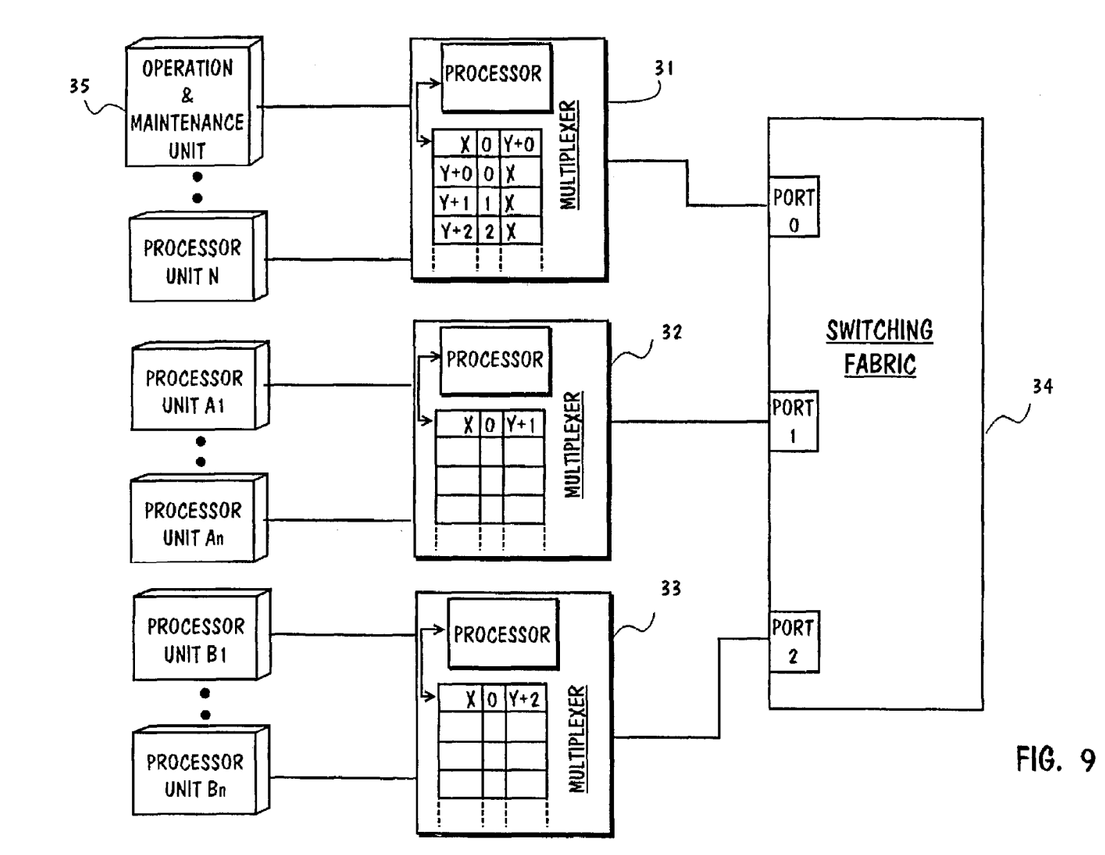
FIG. 9 shows the filling of the index tables.

FIG. 9 shows the tables in the multiplexers after the connection ports have been determined. The question marks in the rows of FIG. 6 have now been replaced with the indexes of the ports which have been determined in accordance with the teaching of the present invention. A prerequisite for the invention is that it is always known to which port the operation and maintenance unit 35 is connected. Here the port is 0.

The multiplexer 1 can now form a table, where the second row contains indexes of the bidirectional virtual connection to the operation and maintenance unit. The indexes are Y+0, 0, and X. Subsequent rows are formed with a simple arithmetic algorithm as follows:

The third row contains indexes of the bidirectional virtual connection between multiplexer 32, which is connected to port 1 and to the operation and maintenance unit. The indexes are Y+1, 1, and X. The fourth row contains indexes of the bidirectional virtual connection between multiplexer 33, which is connected to port 2 and to the operation and maintenance unit. The row is Y+2, 2, and X. If there are more multiplexers as shown in FIG. 9, additional rows are formed in the same way. For example, the row for a multiplexer connected to port K was Y+K, K, and X.

Multiplexer 32 forms a table containing only one row, which is X, 0, Y+1. These indexes connect through the bidirectional virtual connection the multiplexer to port 0, and from there to termination point Y+1, which refers to the third row of the table in multiplexer 31. Accordingly, multiplexer 33 forms a table containing only one row with the indexes X, 0, Y+2. The indexes connect the multiplexer to port 0, and from there to the termination point Y+2, which refers to the third row of the table in multiplexer 31.

As a result, the virtual connection between each multiplexer and the operation and maintenance unit has been established. The multiplexers can now communicate with the operation and maintenance unit and receive configuration information. In addition, the multiplexers can communicate with each other, wherein communication takes place through the operation and maintenance unit. For that purpose, the operation and maintenance unit contains an application program which is intended for transferring messages.

The present invention is applicable to any exchanges, with the prerequisites that information is transferred in fixed length packets or cells and that the number of the ports of the switching fabric is known. Moreover, the communication channels (i.e. row indexes) for the processors of the multiplexers must be determined in accordance with a known algorithm.

The invention claimed is:

1. A method of establishing virtual connections for transmission of packets of internal traffic in a broadband telecommunication switch comprising
   a switching fabric having a plurality of indexed ports, the switching fabric switching an internal traffic packet applied to an input port to the output port indicated in the packet,
   a plurality of processor units,
   an operation and maintenance unit which includes an application for communication with the processor units,
   a plurality of multiplexers, each connected to its own input port of the switching fabric and multiplexing internal traffic packets into said input port, the internal traffic packets arriving from a group of processor units connected to the multiplexer,
   said method further comprising the steps of:
   generating, in each multiplexer, probe packets addressed to every indexed port of the switching fabric, each probe packet containing an index of an associated port;
   sending the probe packets to the switching fabric;
   receiving probe packets from the switching fabric;
   concluding that the multiplexer has been connected to that indexed port of the switching fabric whose index is indicated in the received probe packets; and
   establishing virtual connections between each of the multiplexers and the operation and maintenance unit by binding connection identifiers with indexes of the ports indicated in the received probe packets.

2. The method as claimed in claim 1, wherein the index of the port is located to the address field of the probe packet.

3. The method as in claim 1, wherein the multiplexer to which the operation and maintenance unit is connected initializes a bi-directional connection for each of the multiplexers.

4. The method as in claim 2, wherein said multiplexer forms a switching table comprising a row of indexes, the first index referring to a termination point within the multiplexer, the second index referring to a termination point within another multiplexer, and the third index referring to the index of the port to which said other multiplexer is connected, wherein each row identifies the virtual connection between said multiplexer and another multiplexer.

5. The method as in claim 3, wherein each of the other multiplexers initializes the bi-directional connection for the multiplexer to which the operation and maintenance unit is connected.

6. The method as in claim 5, wherein said other multiplexers form a switching table comprising one row of indexes, the first index referring to a termination point within the multiplexer, the second index referring to a termination point within the operation and maintenance unit, and the third index referring to the index of the port to which the operation and maintenance unit is connected, wherein the row identifies the virtual connection between the multiplexer and the operation and maintenance unit.

7. The method as in claim 1, wherein in absence of received probe packets it is concluded that the multiplexer is in reserve.

8. The method as in claim 1, wherein each multiplexer forms an extra row including an extra termination point and the index of the extra termination point is included in the probe cell.

9. The method as in claim 8, wherein the index of the extra termination point is included in the address field of the probe cell.

10. The method as in claim 8, wherein the internal processor unit of the multiplexer is functionally connected to the extra termination point, whereupon the received cells are transferred to the extra termination point and further to the internal processor unit.

11. The method as in claim 8, wherein the index of the extra termination point is the same in each of the multiplexers.

12. The method as in claim 1, wherein the operation and maintenance unit sends configuration instructions to the multiplexers via the established virtual connections.

13. The method as in claim 4, wherein the indexes in the rows identifying the virtual connections are determined in accordance with a known mathematical algorithm.

14. The method as in claim 13, wherein the first index referring to a termination point is a sum of a constant value and the index of the port and the second index is the same as the index of the port.

15. An apparatus, comprising:
   a generating unit configured to generate, in each multiplexer, probe packets addressed to every indexed port of a switching fabric, the probe packet containing an index of the port;
   a sending unit configured to send the probe packets to the switching fabric;
   a receiving unit configured to receive probe packets from the switching fabric;
   a concluding unit configured to conclude that the multiplexer has been connected to that indexed port of the switching fabric whose index is indicated in the received cells; and
   an establishing unit configured to establish virtual connections between each of the multiplexers and an operation and maintenance unit of a telecommunication switch by binding connection identifiers with indexes of the ports,
   wherein the apparatus is configure to establish virtual connections for transmission of packets of internal traffic in a broadband telecommunication switch, the telecommunication switch comprising the switching fabric having a plurality of indexed ports, the switching fabric switching an internal traffic packet applied to an input port to an output port indicated in the packet, the telecommunication switch further comprising a plurality of processor units, the operation and maintenance unit which includes an application for communication with the processor units and a plurality of multiplexers, each connected to its own input port of the switching fabric and multiplexing internal traffic packets into said input port, the internal traffic packets arriving from a group of processor units connected to the multiplexer.

16. An apparatus, comprising:

generating means for generating, in each multiplexer, probe packets addressed to every indexed port of a switching fabric, the probe packet containing an index of the port;

sending means for sending the probe packets to the switching fabric;

receiving means for receiving probe packets from the switching fabric;

a concluding means for concluding that the multiplexer has been connected to that indexed port of the switching fabric whose index is indicated in the received cells; and an establishing means for establishing virtual connections between each of the multiplexers and an operation and maintenance unit of a telecommunication switch by binding connection identifiers with indexes of the ports, wherein the apparatus is configure to establish virtual connections for transmission of packets of internal traffic in a broadband telecommunication switch, the telecommunication switch comprising the switching fabric having a plurality of indexed ports, the switching fabric switching an internal traffic packet applied to an input port to an output port indicated in the packet, the telecommunication switch further comprising a plurality of processor units, the operation and maintenance unit which includes an application for communication with the processor units and a plurality of multiplexers, each connected to its own input port of the switching fabric and multiplexing internal traffic packets into said input port, the internal traffic packets arriving from a group of processor units connected to the multiplexer.

* * * * *